(12) United States Patent
Yamada et al.

(10) Patent No.: US 6,251,535 B1
(45) Date of Patent: Jun. 26, 2001

(54) BATTERY CASE

(75) Inventors: Hisao Yamada, Yawata; Akihiro Suzuki, Nishinomiya, both of (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/276,793

(22) Filed: Mar. 26, 1999

(30) Foreign Application Priority Data

Mar. 30, 1998 (JP) .................................................. 10-083131

(51) Int. Cl.$^7$ ..................................................... H01M 2/10
(52) U.S. Cl. ............................ 429/100; 429/99; 429/159
(58) Field of Search ................................. 429/96, 97, 98, 429/99, 100, 123, 158, 159

(56) References Cited

U.S. PATENT DOCUMENTS 5,431,575 * 7/1995 Engira .................................. 429/99 X
5,709,963 * 1/1998 Sim ......................................... 429/99

FOREIGN PATENT DOCUMENTS

| 63-162449 | 10/1988 | (JP) . |
| 2-39455 | 3/1990 | (JP) . |
| 7-192711 | 7/1995 | (JP) . |
| 9-43708 | 2/1997 | (JP) . |
| 10-228890 | * 8/1998 | (JP) . |

* cited by examiner

Primary Examiner—Stephen Kalafut
Assistant Examiner—Jonathan Crepeau
(74) Attorney, Agent, or Firm—Armstrong, Westerman, Hattori, McLeland & Naughton, LLP

(57) ABSTRACT

A battery case comprising a case body, a closure for closing an open end of the case body, a pivotal plate pivotally movably supported in the vicinity of an opening edge of another open end of the case body for covering this open end, and a spring attached to the case body externally thereof for biasing the pivotal plate inwardly of the case body. Contact pieces are provided on the closure and the pivotal plate each on the inner surface thereof and adapted to contact the positive electrode and the negative electrode of a battery respectively.

7 Claims, 7 Drawing Sheets

BATTERY CASE

FIELD OF THE INVENTION

The present invention relates to cases for used in compact electronic devices, such as digital cameras, for accommodating dry cells or batteries.

BACKGROUND OF THE INVENTION

FIG. 9 shows a known battery case 1 for use in conventional cameras (see JP-A No. 43708/1997). The case 1 has an opening at its upper end, and the opening is covered with a closure 4. Contact pieces 85, 85 each in the form of an electrically conductive spring piece and in contact with the respective electrodes of a battery 9 are provided respectively on the rear surface of the closure 4 and the bottom of the case 1.

It is required that compact electronic devices of the type mentioned be further reduced in overall size, and the same is required of the battery case. However, when spring pieces are used as the contact pieces 85, 85, the interior space of the case is occupied by an amount corresponding to the combined thickness of the contact pieces 85 and support members therefor even if the contact pieces 85 are deformed by pressing contact with the battery. This makes it difficult to shorten the length of the case.

SUMMARY OF THE INVENTION

The present invention provides a battery case having a pivotable contact piece provided at one end of the case and inwardly biased by a spring provided externally of the case. This assures the contact of the contact piece with the battery accommodated in the case and shortens the overall length of the case.

More specifically, the present invention provides a battery case 1 comprising a battery case body 2 having an opening at each of opposite ends thereof, a closure 4 for openably closing one of the openings of the case body 2, a pivotal plate 3 pivotally movably supported in the vicinity of an opening edge of the other opening 15 of the case body 2 for covering the opening 15, and a spring 5 attached to the case body 2 externally thereof and extending along the case body 2 for biasing the pivotal plate 3 inwardly of the case body 2 to pull the plate 3 toward the case body, contact pieces 85, 41 being provided on the closure 4 and the pivotal plate 3 each on an inner surface thereof and adapted to contact the positive electrode and the negative electrode of a battery respectively.

When a battery is inserted into the case body 2 with the closure 4 opened, the inserted end of the battery pushes up the pivotal plate 3 against the spring 5.

When the closure 4 is closed, the contact pieces on the inner surfaces of the pivotal plate and the closure 4 are held in contact with opposite ends of the battery, i.e., the positive electrode and the negative electrode thereof, respectively.

Since the pivotal plate 3 is biased and pulled inward by the spring 5 at all times, the contact pieces on the pivotal plate 3 and the closure 4 will not separate from the battery, hence no failure to contact the battery.

The spring 5 is disposed along the case body 2 externally thereof, so that variations in the length of the spring 5 will not add to the length of the case body 2. The battery case 1 can therefore be made shorter than conventionally.

DESCRIPTION OF THE PREFERRED EMBODIMENTS

Figure 1:
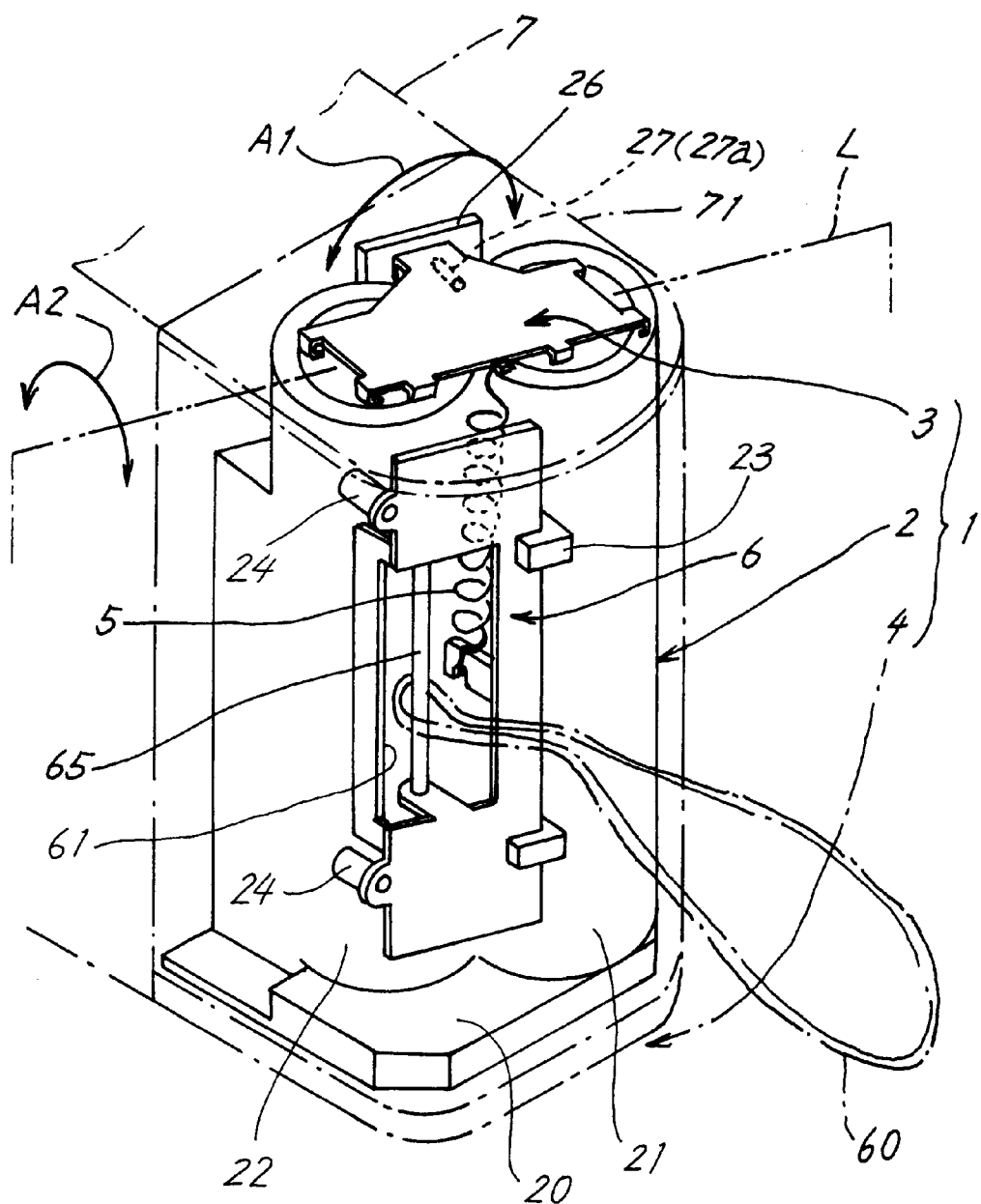
FIG. 1 is a perspective view of a battery case.

FIG. 1 shows a battery case 1 of the invention attached to one end of a digital camera body 7 and removably provided with an end cover 71. The battery case 1 has attached thereto a strap 60 to be gripped by the user carrying the body 7.

Figure 2:
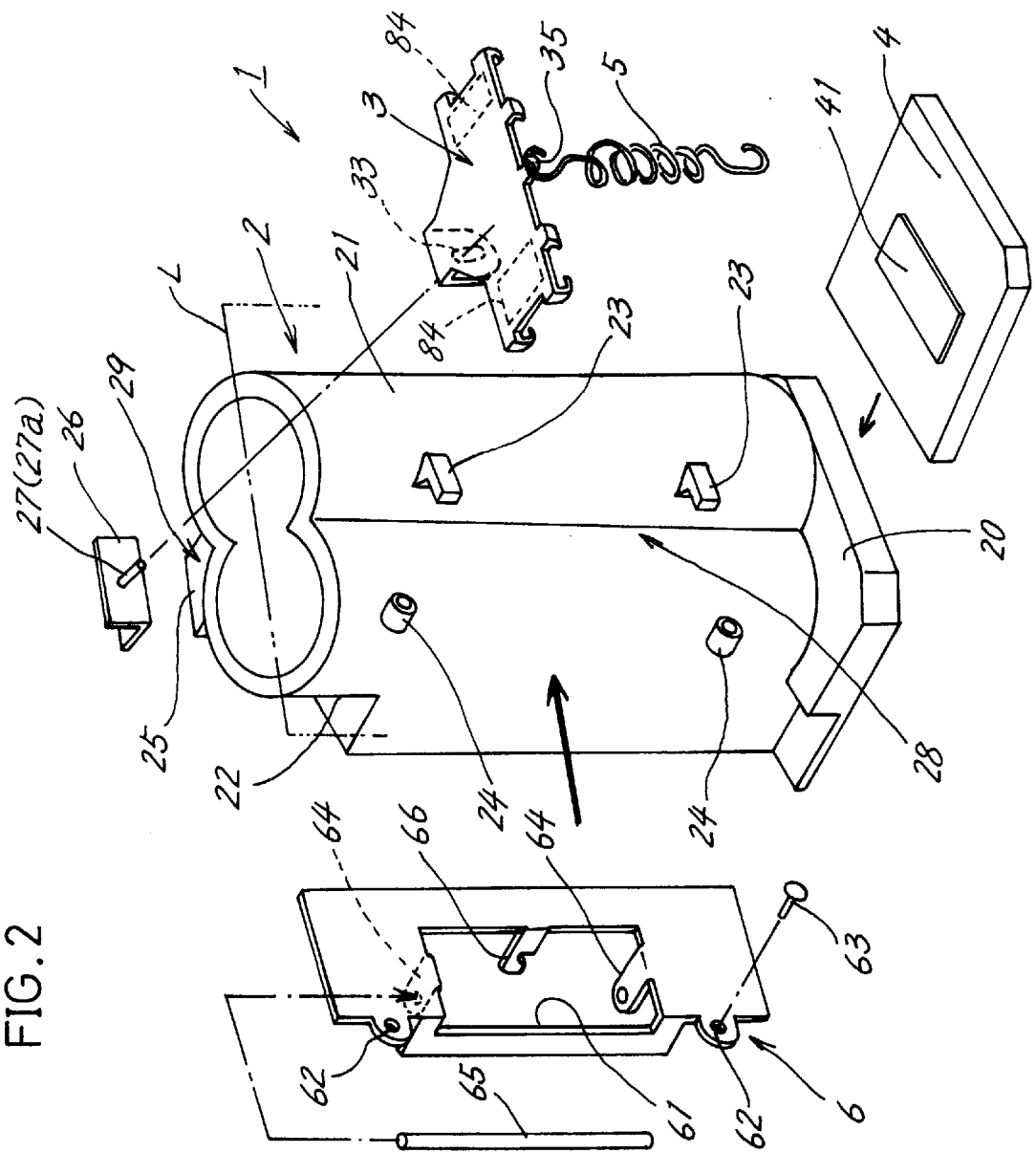
FIG. 2 is an exploded perspective view of the battery case.

FIG. 2 is an exploded perspective view of the battery case 1. The case 1 comprises a vertically elongated case body 2 having an opening at each of opposite ends thereof, a closure 4 for openably closing the lower-end opening of the case body 2, a pivotal plate 3 for covering the upper-end opening 15 of the case body 2, and a tension spring 5 for biasing the pivotal plate 3 downward inwardly of the case body 2.

The case body 2 is integrally molded from a resin and has two hollow cylinders 21, 22 parallel to each other, having the same inside diameter and partly joined at their adjacent sides in communication with each other, and a base plate 20 extending outward from the lower ends of the cylinders 21, 22. Furrowed portions 28, 29 are formed in the body 2 outside the communication portion. The tension spring 5 is disposed in one of the furrowed portions, 28.

To fix the strap connecting plate 6 to be described later to the case body 2, two retainers 23, 23 are provided on the peripheral wall of one of the cylinders, 21, and two bosses 24, 24 on the peripheral wall of the other cylinder 22. The entire height of the case body 2 is slightly smaller than the entire length of the batteries to be encased.

The closure 4, which is necessary for holding the batteries in the case body 2, is provided on the inner surface thereof with a contact piece 41 in the form of a thin plate and positioned across the openings of two cylinders 21, 22 of the case body 2. The closure 4 has a lug (not shown) engageable with the case body 2 when closed for preventing the closure 4 from opening inadvertently with the batteries accommodated in the case body 2.

Figure 4:
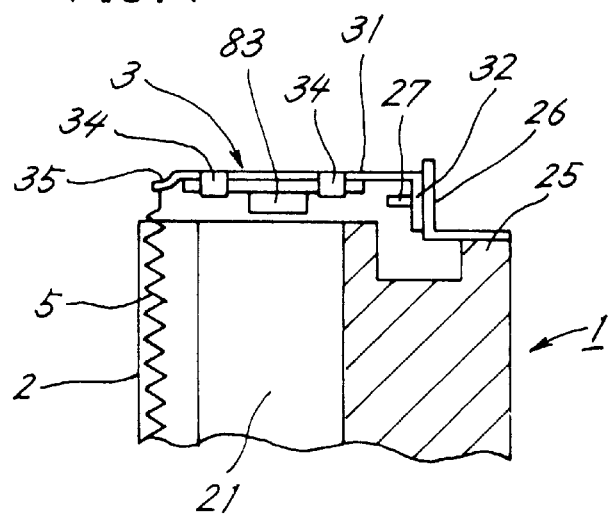
FIG. 4 is a side elevation of the pivotal plate as mounted in position.

Of the two furrowed portions 28, 29 formed in the case body 2 externally thereof, the other furrowed portion 29 has a mount 25 at its upper end, and a bracket 26 is fixed to the mount 25 (see FIGS. 2 and 4). Suppose a phantom plane L containing the axes of the two cylinders 21, 22 of the case body 2 extends longitudinally of the body 2. The bracket 26 carries a horizontal pivot 27 perpendicular to the phantom plane L and pivotally movably supporting the pivotal plate 3 thereon.

Details of The Pivotal Plate

Figure 6:
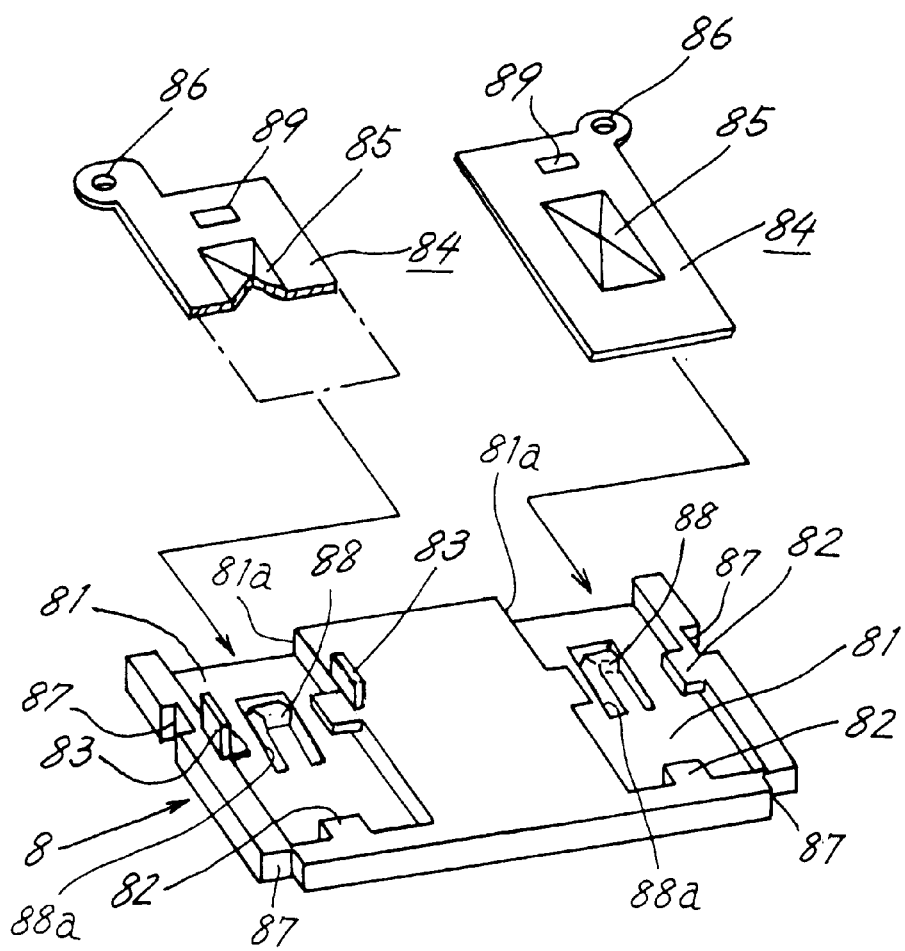
FIG. 6 is an exploded perspective view of the pivotal plate.
Figure 6:
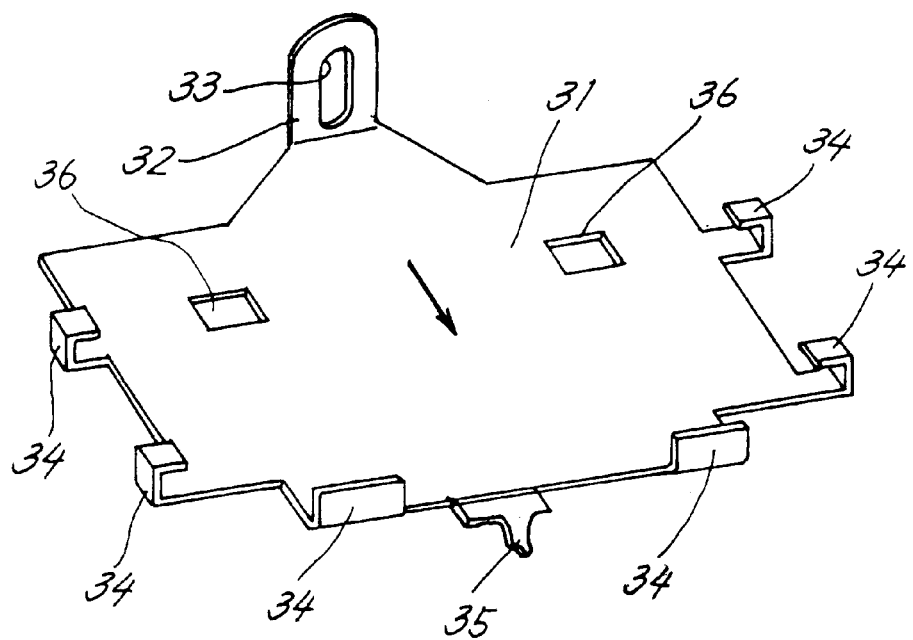

FIG. 6 is an exploded view of the pivotal plate 3 as turned upside down. The pivotal plate 3 comprises an approximately rectangular pivotal plate body 31 made from a metal sheet, two terminal plates 84, 84 similarly made from a metal sheet, and an insulating plate 8 of synthetic resin.

The pivotal plate body 31 has a support 32 projecting upward from the midportion of one side edge along the length thereof and formed with a slot 33 extending vertically. Holes 36, 36 for retaining the insulating plate 8 to be described below are formed in the plate body 31 respectively toward opposite ends thereof. A spring hook 35 projects from the midportion of the other lengthwise side edge of the plate body 31. The plate body 31 has a plurality of claws 34 projecting from the outer periphery thereof.

The insulating plate 8 is in the form of a rectangle lapping over the plate body 31 and has a pair of left and right rectangular recessed portions 81, 81. The recessed portions 81 are open as at 81a at one lengthwise side edge of the insulating plate 8. Each recessed portion 81 has a hook 88 protruding upward and downward from its bottom wall. The bottom wall is cut out through its thickness as at 88a along three sides of the hook 88, which is given elasticity.

The upper edge of the recessed portion 81 defining the recess opening is formed with a plurality of retainers 82. One of the recessed portions 81 has ribs 83, 83 projecting upward respectively from opposite sides thereof for preventing the battery from being loaded in as directed reversely as will be described later.

Each terminal plate 84 is in the form of a rectangle corresponding to the recessed portion 81 of the insulating plate 8 and centrally has a protuberant contact piece 85 for the positive electrode of the battery to contact. The terminal plate 84 has at one corner thereof a projection 86 formed with an eyelet for connecting a lead wire (not shown) to the plate.

Each terminal plate 84 shown in FIG. 6 is tightly fitted into the recessed portion 81 of the insulating plate 8 through the end opening 81a. The hook 88 on the insulating plate 8 fits in a hole 89 formed in the terminal plate 84 (see FIG. 8), and the retainers 82 of the insulating plate 8 bear on the edge of the terminal plate 84, whereby the terminal plate 84 is prevented from slipping out of the opening 81a.

With the terminal plates 84 set in position, cutouts 87 formed in opposite ends of the insulating plate 8 are positioned in coincidence with the corresponding claws 34 of the pivotal plate body 31, and the insulating plate 8 is slidingly moved in the direction of an arrow shown to assemble the pivotal plate 3.

Figure 3:
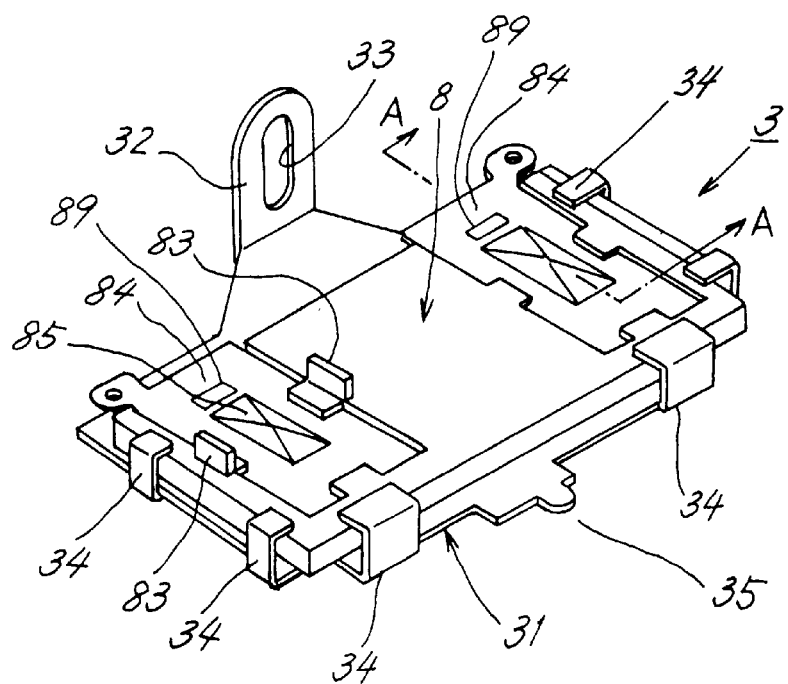
FIG. 3 is a perspective view of a pivotal plate as turned upside down.
Figure 8:
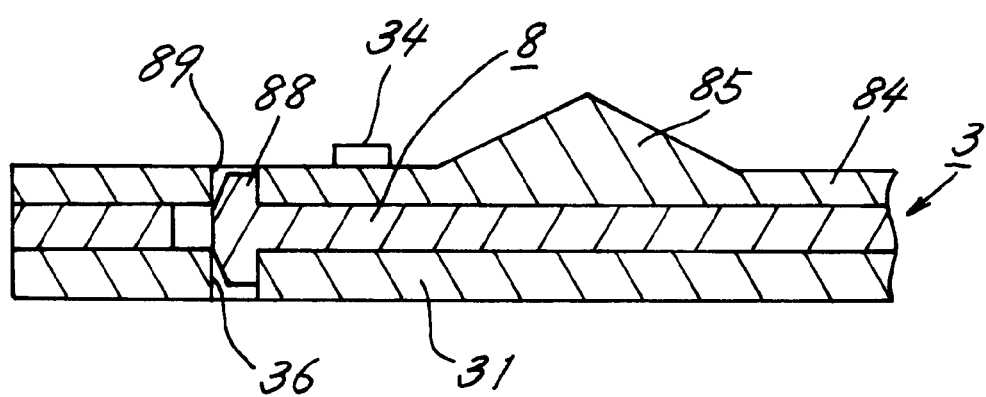
FIG. 8 is a view in section taken along the line A—A in FIG. 3.
Figure 9:
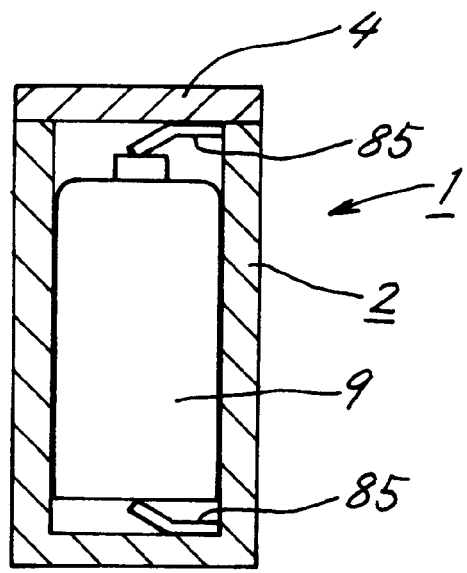
FIG. 9 is a side elevation in section of a conventional case body.

FIG. 3 is a perspective view of the pivotal plate 3 as assembled. FIG. 8 is an enlarged view in section taken along the line A—A in FIG. 3. It is seen that the hook 88 on the insulating plate 8 fits in the retaining hole 36 in the pivotal plate body 31, with the insulating plate 8 engaged by the claw 34 of the plate body 31.

The insulating plate 8 is placed over the upper-end opening of the case body 2 with the terminal plates 84 down. The pivot 27 on the bracket 26 is fitted in the slot 33 of the support 32 loosely movably upward or downward.

As shown in FIG. 1, the pivotal plate 3 is movable about the pivot 27 in the phantom plane L of the case body 2 toward the directions indicated by arrows A1. Since the pivot 27 is loosely fitted in the slot 33 upwardly or downwardly movably, the pivotal plate 3 is pivotally movable in a plane orthogonal to the phantom plane L and extending axially of the case body 2. Thus, the plate 3 is pivotally movable about the pivot 27 in every direction.

Figure 5:
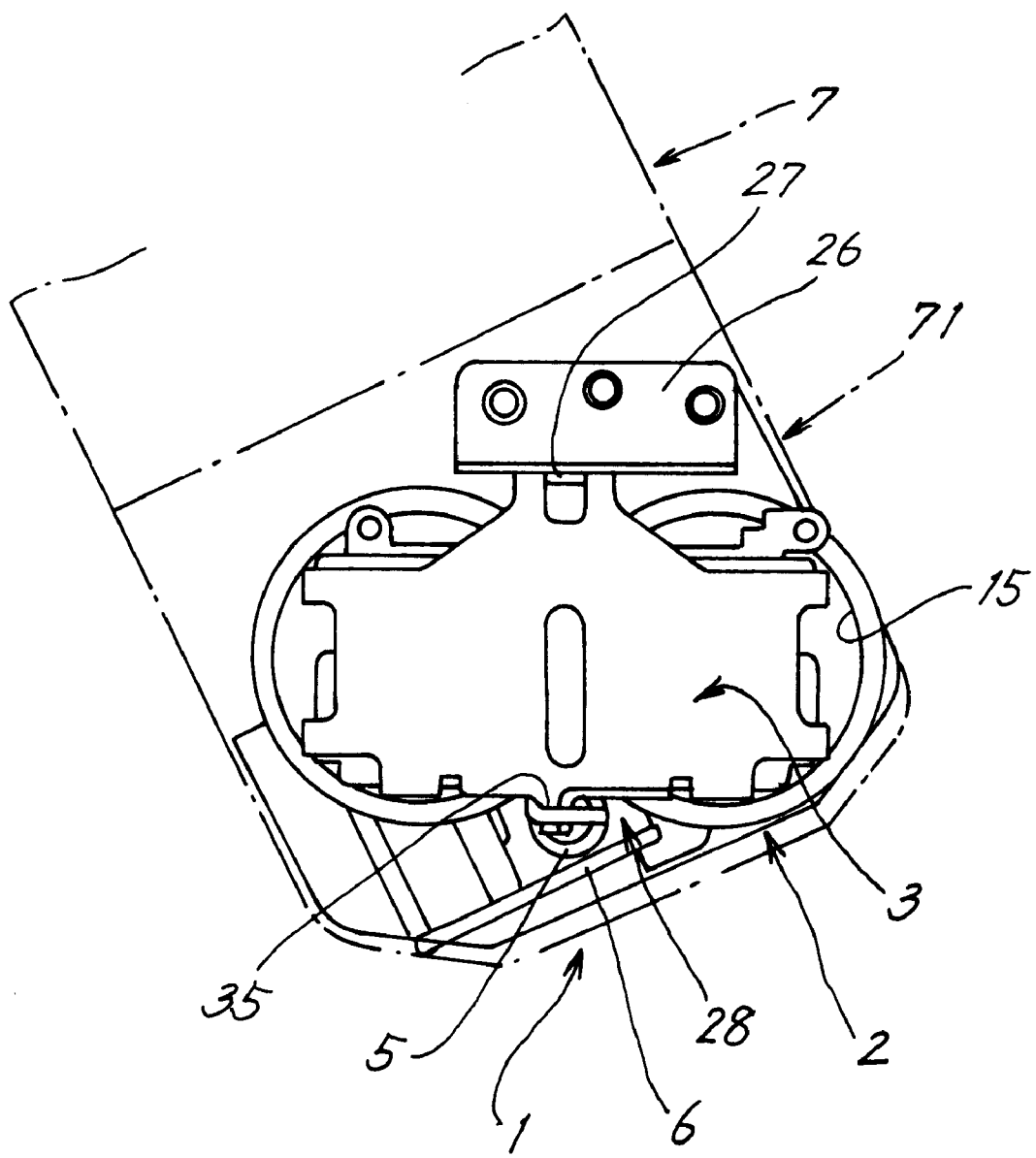
FIG. 5 is a plan view of the battery case.

The upper surface of the pivotal plate 3 is positioned above the pivot 27. In this state, the spring hook 35 of the pivotal plate 3 is positioned immediately above the furrowed portion 28 of the case body 2 (see FIG. 5).

Installation of the Strap Connecting Plate

The strap connecting plate 6 for attaching the strap 60 of the digital camera is fixed to the case body 2. As shown in FIGS. 1 and 2, the plate 6 is made from a metal plate in the form of a vertically elongated rectangle and has an aperture 61 centrally thereof.

A rod 65 extends between and is secured to a pair of lugs 64, 64 extending respectively from the upper and lower edges of the apertured portion 61 at a right angle therewith. The strap 60 is provided around the rod 65 and withdrawn through the aperture 61 and then through a hole (not shown) in the end cover 71 to the outside. A spring hook 66 projects from a vertical side edge of the apertured portion 61 of the connecting plate 6 in the same direction as the lugs 64, 64.

The strap connecting plate 6 is engaged with the two retainers 23, 23 on the case body 2 and fastened to the body 2 with screws 63 inserted through two screw holes 62, 62 which are registered with the respective bosses 24, 24 on the case body 2.

The tension spring 5 is inserted into a space between the strap connecting plate 6 and the furrowed portion 28 of the case body 2. The upper end of the spring 5 is engaged with the spring hook 35 of the pivotal plate 3, and the spring lower end with the spring hook 66 of the connecting plate 6.

Insertion of Batteries

Figure 7:
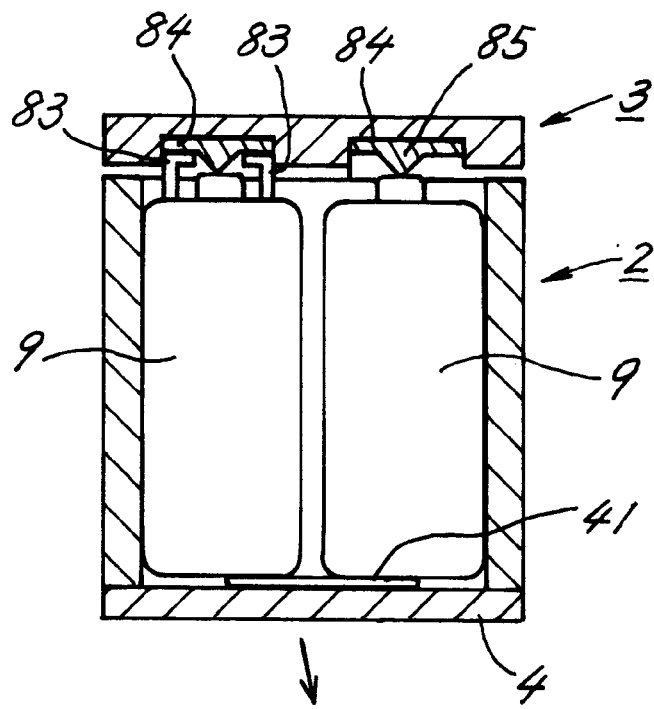
FIG. 7 is a side elevation in section of a case body having batteries accommodated therein.

FIG. 7 is a side elevation in section of the case body 2 accommodating batteries 9. The closure 4 is opened, and the batteries 9 are inserted into the case body 2 with their positive electrodes directed toward the case body opening. The positive electrode of the battery 9 fits in between the reverse insertion preventing ribs 83, 83, and the electrode end comes into contact with the contact piece 85, pushing the pivotal plate 3 against the spring 5. If the battery 9 is inserted as directed reversely, the negative electrode of the battery comes into contact with the ribs 83, 83, permitting the positive electrode of the battery to be left projected from the lower end of the case body 2. Since the closure 4 can not be closed in this state, the user becomes aware of the error in inserting the battery 9.

When the closure 4 is closed, the contact pieces 85, 85, and 41 on the respective inner surfaces of the pivotal plate 3 and the closure 4 are held in contact with the positive electrodes and the negative electrodes which are opposite ends of the batteries.

The pivotal plate 3 is so supported as to be pivotally movable in the phantom plane L through the case body 2 and also in a plane orthogonal to the plane L and extending along the case body 2, and is inwardly biased by the spring 5 at all times. The pivotal plate 3 is therefore inclined to invariably hold the contact pieces 85, 85 thereof in contact with the ends of the two batteries opposed thereto, whereby a failure to contact the battery electrodes is avoidable.

The spring 5 is disposed in the space of the furrowed portion 28 outside the case body 2. This eliminates the likelihood that the presence of the spring 5 will necessitate a greater space for the installation of the battery case 1. The length of the spring 5 produces no influence on the length of the case body 2, permitting the battery case 1 to have a shorter length than conventionally.

The pivotal plate 3 is pivotally movable as supported at a point 27a which is positioned below the upper surface of the plate 3, so that the overall height required of the battery case 1 can be minimized to the sum of the length of the batteries, the thickness of the pivotal plate 3 and the thickness of the closure 4.

FIG. 4, a side elevation view of the pivotal plate mounted in position, shows pivot 27 which is positioned closer to the open end of case body 2 than the upper surface of pivotal plate 3, so as to achieve the above-described minimized overall height.

Figure 10:
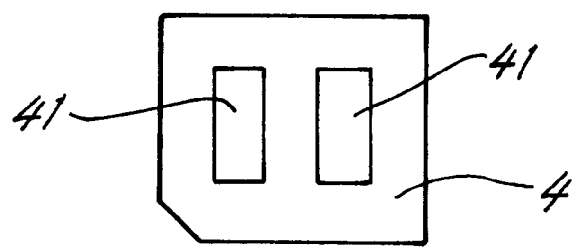
FIG. 10 is a plan view showing a modified closure.

In practicing the present invention, two contact pieces 41, 41 insulated from each other may alternatively be provided on the closure 4 as seen in FIG. 10, with the contact pieces 85, 85 on the pivotal plate 3 connected together electrically.

The case body 2 may be adapted to accommodate one battery. The pivotal plate 3 may then be made pivotally movable simply in one direction as pivoted at one end thereof.

Further even if the case body 2 is designed to accommodate two batteries, the pivotal plate 3 may be made pivotally movable only in a plane orthogonal to the phantom plane L if the error involved in the entire length of batteries is small and negligible.

What is claimed is:

1. A battery case comprising a battery case body having open opposite ends, a closure for openably closing one of the open ends of the case body, a pivot and a pivotal plate pivotally movably supported on said pivot in the vicinity of an opening edge of the other open end of the case body for covering the other open end, and a spring attached to the case body externally thereof and extending along the case body for biasing the pivotal plate inwardly of the case body, contact pieces being provided on the closure and the pivotal plate each on an inner surface thereof and adapted to contact a positive electrode and a negative electrode of a battery respectively, said spring being attached to the pivotal plate at a side edge opposite a side edge at which said pivotal plate is supported.

2. A battery case according to claim 1 wherein the pivotal plate is pivotally movable as supported at a point positioned closer to said other open end of the case body than an upper surface of the pivotal plate.

3. A battery case comprising a battery case body having open opposite ends, a closure for openably closing one of the open ends of the case body, a pivotal plate pivotally movably supported in the vicinity of an opening edge of the other open end of the case body for covering the other open end, and a spring attached to the case body externally thereof and extending along the case body for biasing the pivotal plate inwardly of the case body, contact pieces being provided on the closure and the pivotal plate each on an inner surface thereof and adapted to contact a positive electrode and a negative electrode of a battery respectively, said case body having two joined hollow cylinders each adapted to accommodate the battery therein, and the pivotal plate closing openings of the two cylinders, the spring being disposed in a space of a furrowed portion of the case body formed externally thereof and provided by a joint of the two cylinders.

4. A battery case according to claim 3 wherein the pivotal plate is so supported as to be pivotally movable in a phantom plane L containing axes of the two cylinders of the case body and to be pivotally movable in a plane orthogonal to the phantom plane L and extending along the case body.

5. A battery case according to claim 3 wherein the pivotal plate is pivotally movable as supported at a point positioned closer to the case body than an upper surface of the pivotal plate.

6. A battery case according to claim 4 wherein the pivotal plate is pivotally movable as supported at a point positioned closer to the case body than an upper surface of the pivotal plate.

7. A battery case according to claim 4 wherein the pivotal plate comprises a pivotal plate body formed with a slot having fitted therein a pivot projecting from the case body.

* * * * *